(12) United States Patent
Qu et al.

(10) Patent No.: US 12,528,381 B2
(45) Date of Patent: Jan. 20, 2026

(54) METHOD, DEVICE AND SYSTEM FOR VEHICLE POWER BATTERY AUXILIARY EQUILIBRIUM

(71) Applicant: Autel New Energy Co., Ltd., Shenzhen (CN)

(72) Inventors: Songsong Qu, Shenzhen (CN); Xiaojie Shen, Shenzhen (CN)

(73) Assignee: AUTEL NEW ENERGY CO., LTD., Shenzhen (CN)

( * ) Notice: Subject to any disclaimer, the term of this patent is extended or adjusted under 35 U.S.C. 154(b) by 616 days.

(21) Appl. No.: 18/052,938

(22) Filed: Nov. 7, 2022

(65) Prior Publication Data

US 2023/0219451 A1 Jul. 13, 2023

(30) Foreign Application Priority Data

Jan. 7, 2022 (CN) .......................... 202210018197.6

(51) Int. Cl.
*B60L 53/68* (2019.01)
*B60L 50/60* (2019.01)
(Continued)

(52) U.S. Cl.
CPC ............... *B60L 53/68* (2019.02); *B60L 50/60* (2019.02); *B60L 53/66* (2019.02); *B60L 58/12* (2019.02); *B60L 58/22* (2019.02)

(58) Field of Classification Search
CPC ....................................................... B60L 53/68
(Continued)

(56) References Cited

U.S. PATENT DOCUMENTS

2006/0022639 A1  2/2006  Moore
2011/0288743 A1  11/2011  Smith
(Continued)

FOREIGN PATENT DOCUMENTS

CN    105564262 A    5/2016
CN    205544506 U    8/2016
(Continued)

OTHER PUBLICATIONS

Search report of CN patent application No. 202210018197.6 issued on Jun. 6, 2023.
(Continued)

*Primary Examiner* — Jerry D Robbins
(74) *Attorney, Agent, or Firm* — Andrew C. Cheng

(57) ABSTRACT

A method, a device and a system for vehicle power battery auxiliary equilibrium is provided. The method includes: determining a degree value of a power battery inconsistency problem by a cloud platform according to data of the power battery; and according to the degree value of the power battery inconsistency problem, triggering by the cloud platform an auxiliary equilibrium charging strategy to be issued to a charging device, so that the charging device charges the power battery according to the issued auxiliary equilibrium charging strategy. According to the embodiments of the present application, it is possible to assist the equilibrium function of a vehicle-side battery management system, repair the power battery inconsistency problem, increase the full-power mileage of the electric vehicles, extend the service life of the power battery, and reduce the cost of using the vehicle. It does not affect the user's daily vehicle use experience.

10 Claims, 2 Drawing Sheets

(51) Int. Cl.
*B60L 53/66* (2019.01)
*B60L 58/12* (2019.01)
*B60L 58/22* (2019.01)

(58) Field of Classification Search
USPC .......................................................... 320/109
See application file for complete search history.

(56) References Cited

U.S. PATENT DOCUMENTS

| 2012/0330475 | A1* | 12/2012 | Chen ..................... G06F 1/3212 |
| | | | 700/292 |
| 2016/0243956 | A1 | 8/2016 | Yuan |
| 2018/0287430 | A1* | 10/2018 | Kutkut .............. H02J 13/00001 |
| 2018/0331546 | A1* | 11/2018 | Kutkut .................. B60L 3/0046 |
| 2018/0339601 | A1 | 11/2018 | Kruszelnicki |

FOREIGN PATENT DOCUMENTS

| CN | 109367433 A | 2/2019 |
| CN | 111572406 A | 8/2020 |
| CN | 111799856 A | 10/2020 |
| CN | 111913985 A | 11/2020 |
| GB | 2578672 A | 5/2020 |

OTHER PUBLICATIONS

The extended European search report of EP application No. 22205616.0 issued on Apr. 19, 2023.
Search report of CN application No. 202210018197.6 issued on Dec. 8, 2023.

\* cited by examiner

METHOD, DEVICE AND SYSTEM FOR VEHICLE POWER BATTERY AUXILIARY EQUILIBRIUM

This application claims priority to Chinese Patent Application No. 202210018197.6, entitled "A Method, a Device and a System for Vehicle Power Battery Auxiliary Equilibrium", filed to the China Patent Office on Jan. 7, 2022, the entire contents of which are incorporated herein by reference.

TECHNICAL FIELD

The present application relates to the field of new energy vehicles, and more particularly to a method, a device and a system for vehicle power battery auxiliary equilibrium.

BACKGROUND ART

At present, new energy vehicles have become priority for consumers to purchase vehicles for their clean and environmental protection. Power battery system is a core component of new energy vehicles. The power battery system is usually composed of dozens or hundreds of battery cells connected in series to meet the demand input voltage of the drive motor of new energy vehicles. However, it also causes the battery inconsistency problem. With the increase of battery usage time, the battery inconsistency problem is aggravated, and the overall capacity of the system is attenuated in an accelerated way, which may cause the risks of sudden drop of the vehicle's driving range and sudden power loss during driving.

At present, the main method of solving the battery inconsistency problem by Battery Management System (BMS) at the vehicle side is battery equilibrium. When the BMS identifies the problem of battery pack inconsistency, it adjusts the power of individual battery by an additional electronic circuit, namely, an equilibrium circuit, so as to reduce the difference between batteries. However, since the voltage fluctuation of the power battery is small in a SOC (State of Charge) between 20% and 80%, it is difficult for the vehicle-side BMS to identify the battery pack inconsistency. In addition, the general vehicle-side BMS strategy is the charging end equilibrium, which stops the equilibrium after the end of charging, resulting in a short equilibrium time. Therefore, the equilibrium capability of the equilibrium circuit is limited. The vehicle power battery inconsistency problem is getting worse and worse, which finally leads to an irreparable degree, and they can only be returned to the factory for replacement, greatly increasing the cost of vehicle use.

SUMMARY OF THE INVENTION

The embodiments of the present application is directed to provide a method, a device and a system for vehicle power battery auxiliary equilibrium, aiming to solve the problems that an existing power battery inconsistency causes a decrease in a fully-charged endurance mileage of an electric vehicle, affects the service life of the power battery and increases the cost of using the vehicle.

In order to solve the above technical problem, the embodiments of the present application provide the following technical solutions; a method for vehicle power battery auxiliary equilibrium is provided, the method comprising:

determining a degree value of inconsistency problem of a power battery of a vehicle by a cloud platform according to data of the power battery;

according to the degree value of inconsistency problem of the power battery, triggering by the cloud platform an auxiliary equilibrium charging strategy to be issued to a charging device, so that the charging device charges the power battery according to the issued auxiliary equilibrium charging strategy.

Optionally, determining a degree value of inconsistency problem of the power battery by a cloud platform according to data of the power battery comprises: analyzing by the cloud platform inconsistency problem of individual batteries according to multiple dimensions of a difference value of individual voltages, a difference value of internal resistances of individual batteries, a difference value of full capacitance of individual batteries and a difference value of current voltage capacity of individual batteries so as to determine the degree value of the inconsistency problem of the power battery.

Optionally, triggering by the cloud platform an auxiliary equilibrium charging strategy to be issued to a charging device according to the degree value of the power battery inconsistency problem comprises:

determining a power battery inconsistency threshold value of the same vehicle type;

comparing the degree value of inconsistency problem of the power battery of the vehicle with the power battery inconsistency threshold value of the same vehicle type, and triggering an auxiliary equilibrium charging strategy to be issued to a charging device when the degree value of inconsistency problem of the power battery of the vehicle exceeds the power battery inconsistency threshold value of the same vehicle type.

Optionally, the power battery inconsistency threshold value of the same vehicle type is derived from a database of power battery inconsistency threshold values of different vehicle types pre-established by the cloud platform.

Optionally, the method further comprises dynamically adjusting by the cloud platform the power battery inconsistency threshold value according to a vehicle-side battery management system equilibrium strategy.

Optionally, the auxiliary equilibrium charging strategy comprises: performing high-rate charging when the power battery electric quantity or individual voltage does not reach a start condition of the vehicle-side battery management system equilibrium strategy; performing trickle charging when it is predicted that the temperature of the power battery will rise to reach or exceed the start condition of the vehicle-side battery management system equilibrium strategy; performing pulse charging when the voltage difference of the individual batteries does not reach the start condition of the vehicle-side battery management system equilibrium strategy; wherein the start condition of the vehicle-side battery management system equilibrium strategy comprises one of the followings that the voltage capacity of the power battery or individual voltage is higher than a first set value, the temperature of the power battery is lower than a second set value, and voltage difference among the individual batteries is higher than a third set value.

Optionally, the method further comprises dynamically adjusting by the cloud platform the auxiliary equilibrium charging strategy according to real-time charging monitoring data uploaded by the charging device during the charging process of the power battery.

Optionally, the method further comprises dynamically adjusting by the cloud platform the auxiliary equilibrium charging strategy according to user habits.

In order to solve the above technical problem, the embodiments of the present application further provide a device for vehicle power battery auxiliary equilibrium, which is used for the method for vehicle power battery auxiliary equilibrium according to any of the embodiments of the present application.

In order to solve the above technical problem, the embodiments of the present application further provide a system for vehicle power battery auxiliary equilibrium. The system comprises a charging device and a device for vehicle power battery auxiliary equilibrium according to any embodiment of the present application, wherein the device for vehicle power battery auxiliary equilibrium is configured for triggering an auxiliary equilibrium charging strategy to be issued to the charging device according to a degree value of inconsistency problem of a power battery, and the charging device is configured for charging the power battery according to the issued auxiliary equilibrium charging strategy.

Compared with the prior art, the embodiments of the present application provide a method, a device and a system for vehicle power battery auxiliary equilibrium, wherein the cloud platform determines a degree value of a power battery inconsistency problem according to data of the power battery, triggers an auxiliary equilibrium charging strategy according to the degree value of inconsistency problem of the power battery, issues same to the charging device, and enables the charging device to charge the power battery according to the issued auxiliary equilibrium charging strategy, so as to assist the equilibrium function of the vehicle-side BMS, repair the inconsistency problem of the power battery, increase the full-power mileage of the electric vehicles, extend the service life of the power battery, and reduce the cost of using the vehicle. It does not affect the user's daily vehicle use experience, so that the power battery inconsistency problem can be automatically repaired in the background under the user experience without feeling, so as to improve the user experience.

BRIEF DESCRIPTION OF THE DRAWINGS

One or more embodiments are exemplified by the pictures in the accompanying drawings corresponding to them. The illustrative description does not constitute a limitation for embodiments. Those elements with the same reference numerals in the accompanying drawings are represented as similar elements, and the figures in the accompanying drawings do not constitute a proportion limitation unless otherwise stated.

DETAILED DESCRIPTION OF THE INVENTION

Figure 1:
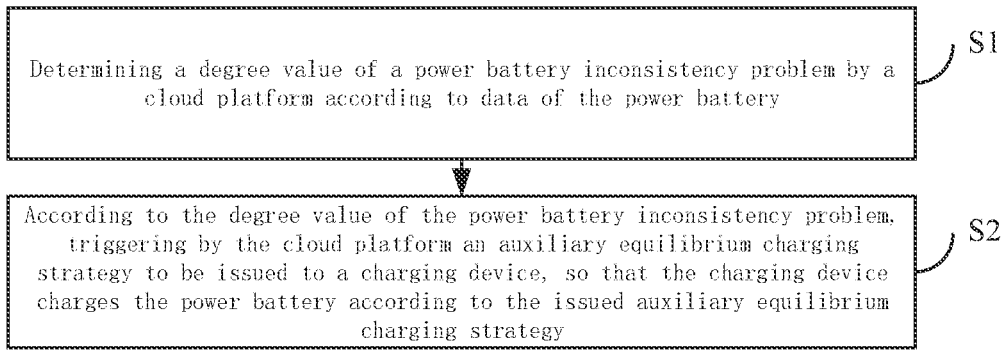
FIG. 1 is a schematic flow diagram of a method for vehicle power battery auxiliary equilibrium provided by the present application.

To facilitate an understanding of the present application, a more particular description of the application will be rendered by reference to the appended drawings and specific embodiments. It will be understood that when an element is referred to as being "secured" to another element, it can be directly on the other element, or one or more intervening elements may be present. When an element is referred to as being "connected" to another element, it can be directly connected to the other element, or intervening elements may be present. As used in this description, the terms "upper", "lower", "inner", "outer", "bottom", and the like indicate orientations or positional relationships based on the orientation or positional relationships shown in the drawings, are merely for convenience in describing and simplifying the present application, and do not indicate or imply that the referenced devices or elements must have a particular orientation and be constructed and operated in a particular orientation, which are thus not to be construed as limiting the present application. Furthermore, the terms "first", "second", "third", and the like are used for descriptive purposes only and are not to be construed as indicating or implying relative importance.

Unless defined otherwise, all technical and scientific terms used in the specification have the same meaning as commonly understood by one of ordinary skill in the art to which this application belongs. The terms used in the description of the invention herein are for the purpose of describing particular embodiments only and are not intended to be limiting of the application. As used herein, the term "and/or" includes any and all combinations of one or more of the associated listed items.

Furthermore, the technical features involved in the different embodiments of the present application described below can be combined with each other as long as they do not conflict with each other.

Power battery system is a core component of new energy vehicles. The power battery system is usually composed of dozens or hundreds of battery cells connected in series to meet the demand input voltage of the drive motor of new energy vehicles. At the same time, the high endurance demand of electric vehicles promotes the development of battery platform to higher voltage, which requires more series number of individual batteries. At the end of charging, when a maximum individual voltage $V_{max}$ reaches a set charging cut-off voltage, the system reaches a full-charge condition, with SOC being shown as 100%. However, due to the inconsistency in battery performance, most other individual batteries are not fully charged. During the discharging, a minimum individual voltage $V_{min}$ first reaches a set discharging cut-off voltage, and the system cannot discharge more power, with SOC being shown as 0%. This is the formation of a "short plate effect" when the batteries are used in series in battery packs, i.e. the overall capacity of the system is lower than the lowest capacity in a single string of batteries. With the increase of battery use time, the performance inconsistency problem is aggravated, and the overall capacity of the system is attenuated in an accelerated way, which may cause the risks of sudden drop of the vehicle's driving range and sudden power loss during driving. The reason for the inconsistency of the battery is various. The production process of battery cells is complicated, and it is determined that it is impossible to produce a individual battery cell in one model. Inconsistent spatial location of batteries and uneven internal temperature distribution after being in series for grouping make it impossible for the use environment of each battery to be completely consistent. These factors cannot be completely avoided, so that the battery inconsistency cannot be completely eliminated, and can only be balanced as much as possible to maximize the capacity of each battery.

At present, the main method of solving the battery inconsistency problem by BMS at the vehicle side is battery equilibrium. When the BMS identifies the problem of battery pack inconsistency, it adjusts the power of individual battery by an additional electronic circuit, namely, an equilibrium circuit, so as to reduce the difference between batteries. However, the voltage fluctuation of the power battery when SOC is between 20% and 80%, is small, which makes it difficult for the BMS at the vehicle side to identify the battery pack inconsistency problem. Moreover, the equilibrium circuit itself consumes power. The common BMS strategy at the vehicle side provides equilibrium at the end of charging, which stops the equilibrium after the end of charging, resulting in a shorter equilibrium time. Furthermore, the equilibrium circuit itself has a limited equilibrium capability, and the general equilibrium current is only about 0.1 A. If the equilibrium function cannot work effectively, the inconsistency problem of the vehicle power battery is getting worse and worse, which finally leads to an irreparable degree, and they can only be returned to the factory for replacement, greatly increasing the cost of vehicle use.

In view of this, the present application provides a method for vehicle power battery auxiliary equilibrium. The cloud platform determines a degree value of a power battery inconsistency problem according to data of the power battery, triggers an auxiliary equilibrium charging strategy according to the degree value of the power battery inconsistency problem, issues same to the charging device, and enables the charging device to charge the power battery according to the issued auxiliary equilibrium charging strategy, so as to repair the power battery inconsistency problem, increase the full-power mileage of the electric vehicles, extend the service life of the power battery, and reduce the cost of using the vehicle.

In order to facilitate an understanding of the above inventive concepts of the present application, a more particular description of the inventive concepts of the present application will be rendered by reference to appended drawings and specific embodiments.

In an embodiment, as shown in FIG. 1, the present application provides a method for vehicle power battery auxiliary equilibrium, the method including:

S1, determining a degree value of inconsistency problem of a power battery of a vehicle by a cloud platform according to data of the power battery; and S2, according to the degree value of inconsistency problem of the power battery, triggering by the cloud platform an auxiliary equilibrium charging strategy to be issued to a charging device, so that the charging device charges the power battery according to the issued auxiliary equilibrium charging strategy.

In the embodiment, the cloud platform determines a degree value of inconsistency problem of a power battery according to data of the power battery, triggers an auxiliary equilibrium charging strategy according to the degree value of inconsistency problem of the power battery, issues same to the charging device, and enables the charging device to charge the power battery according to the issued auxiliary equilibrium charging strategy, so as to assist the equilibrium function of the vehicle-side BMS, repair the power battery inconsistency problem, increase the full-power mileage of the electric vehicles, extend the service life of the power battery, and reduce the cost of using the vehicle. It does not affect the user's daily vehicle use experience, so that the power battery inconsistency problem can be automatically repaired in the background under the user experience without feeling, so as to improve the user experience.

In an embodiment, in the step S1, the cloud platform determines a degree value of inconsistency problem of the power battery according to data of the power battery.

Specifically, the data of the power battery includes power battery data during vehicle charging and power battery data during vehicle driving, is collected by a vehicle-mounted communication interface (VCI) during the vehicle charging and driving, and is uploaded to the cloud platform via a preset communication mode.

The data of the power battery includes one of the following: a total voltage $V_{pack}$ of the power battery, a maximum individual voltage $V_{max}$, a minimum individual voltage $V_{min}$, a charging time t, a charging current I, an initial SOC, a cut-off SOC, a driving range, a maximum temperature $T_{max}$, and an equilibrium state.

The preset communication mode includes a short-range wireless communication mode (e.g. Bluetooth, WiFi), or a mobile communication mode (e.g. 4G or 5G mobile communication). When a short-range wireless communication mode is used, the VCI itself has a short-range wireless communication function, but does not have a mobile communication function. The charging device has a short-range wireless communication function and a mobile communication function. The VCI establishes a short-range wireless connection with the charging device. The charging device establishes a mobile communication connection with the cloud platform. The VCI sends the collected data of the power battery to the charging device via the short-range wireless connection, and then sends same to the cloud platform via the mobile communication connection of the charging device.

When the mobile communication mode is used, the VCI has a mobile communication function, and the VCI directly establishes a mobile communication connection with the cloud platform via the mobile communication function, and sends the collected data of the power battery to the cloud platform via the mobile communication connection.

The power battery inconsistency problem is the inconsistency problem of the vehicle power battery during the charging process and the driving process.

The determining a degree value of a power battery inconsistency problem by a cloud platform according to data of the power battery includes the followings.

The cloud platform synthesizes various parameter data of the power battery, analyzes a power battery inconsistency problem according to multiple dimensions of an individual voltage difference value $A_1$, an individual internal resistance difference value $A_2$, an individual full capacitance difference value $A_3$, and an individual current electric quantity difference value $A_4$ so as to determine the degree value X of the power battery inconsistency problem.

$$X = \omega_1 A_1 + \omega_2 A_2 + \omega_3 A_3 + \omega_4 A_4$$

In the above formula, $\omega_1$, $\omega_2$, $\omega_3$, and $\omega_4$ are weights corresponding to the difference value of each parameter of the power battery.

Figure 2:
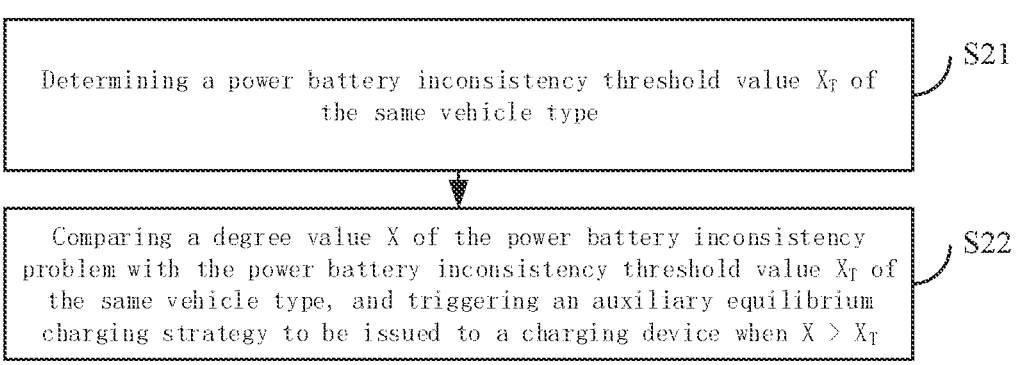
FIG. 2 is a schematic flow diagram for triggering an auxiliary equilibrium charging strategy to be issued to a charging device according to a degree value of a power battery inconsistency problem in a method for vehicle power battery auxiliary equilibrium provided by the present application.

In an embodiment, as shown in FIG. 2, in the step S2, the triggering by the cloud platform an auxiliary equilibrium charging strategy to be issued to a charging device according to the degree value of the power battery inconsistency problem includes:

S21, determining a power battery inconsistency threshold value $X_T$ of the same vehicle type.

Here, the power battery inconsistency threshold value of the same vehicle type is derived from a database of power battery inconsistency threshold values of different vehicle types pre-established by the cloud platform.

Different types of new energy vehicles have different types of power battery systems. Different battery materials cause different battery state characteristics. Therefore, the power battery inconsistency threshold value $X_T$ also varies with different battery types and battery systems. In the present application, a database of the power battery inconsistency threshold value $X_T$ of different vehicle types is pre-established by the cloud platform for different vehicle types, and the power battery inconsistency threshold value $X_T$ of different vehicle types can be covered.

Since the power battery inconsistency threshold value $X_T$ is used for triggering the auxiliary equilibrium charging strategy, if the power battery inconsistency threshold value $X_T$ is set too low, it is easy to trigger the auxiliary equilibrium charging function too frequently, which will lead to poor user experience, such as too long charging time, additional consumption of charging capacity, etc. If the power battery inconsistency threshold value $X_T$ is set too high, it will be difficult to trigger the auxiliary equilibrium charging function, and the auxiliary equilibrium charging effect will not be achieved.

Therefore, further, the cloud platform will adjust the power battery inconsistency threshold value $X_T$ intelligently and dynamically according to the vehicle-side BMS equilibrium strategy. Specifically, the cloud platform can intelligently adjust the power battery inconsistency threshold value $X_T$ of the target vehicle to an appropriate value by analyzing the vehicle-side BMS equilibrium strategies such as the average threshold value of the power battery inconsistency of the same vehicle type and the auxiliary equilibrium duration, so that the triggering of the auxiliary equilibrium charging strategy is more in line with the actual demand of the power battery of the target vehicle, and is continuously dynamically modified with the aging state of the battery.

S22, comparing a degree value of inconsistency problem of the power battery of the vehicle with the power battery inconsistency threshold value $X_T$ of the same vehicle type, and triggering an auxiliary equilibrium charging strategy to be issued to a charging device.

Specifically, the degree value X of the power battery inconsistency problem is compared with the power battery inconsistency threshold value $X_T$ of the same vehicle type. When the degree value X of the power battery inconsistency problem of the vehicle exceeds the power battery inconsistency threshold value $X_T$ of the same vehicle type, i.e. $X>X_T$, the auxiliary equilibrium charging strategy is triggered to be issued to the charging device.

Here, the auxiliary equilibrium charging strategy includes: performing high-rate charging when the battery capacity of the power battery or individual voltage does not reach a start condition of the vehicle-side battery management system equilibrium strategy; performing trickle charging when the temperature of the power battery is high, or when it is predicted that the temperature rise of the power battery will reach or exceed the start condition of the vehicle-side BMS equilibrium strategy; performing pulse charging when the voltage difference of the individual battery does not reach the start condition of the vehicle-side BMS equilibrium strategy; wherein the start condition of the vehicle-side BMS equilibrium strategy includes one of the followings that the battery capacity of the power battery or individual voltage is higher than a first set value, the power battery temperature is lower than a second set value, and voltage difference among the individual batteries is higher than a third set value.

The effect of the auxiliary equilibrium charging of the power battery is related to the state parameters such as the battery capacity of the power battery, the maximum voltage of the individual battery, the charging current, the temperature of the power battery and the voltage difference of the individual battery.

Therefore, the cloud platform dynamically adjusts the auxiliary equilibrium charging strategy according to real-time charging monitoring data uploaded by the charging device during the charging process of the power battery, specifically including:

BMS equilibrium is generally a power consuming process, and one of the start conditions of the vehicle-side BMS equilibrium strategy is that the battery capacity of the power battery or the individual voltage is higher than a first set value. In order to shorten the overall charging time of the power battery, according to the real-time charging monitoring data uploaded by the charging device during the charging process of the power battery, the cloud platform enables the charging device to charge as much as possible according to the maximum current requested by the BMS when the battery capacity of the power battery or individual voltage does not reach the BMS equilibrium start condition, namely, performing high-rate charging.

BMS equilibrium is generally a process of heat generation, and one of the start conditions of the vehicle-side BMS equilibrium strategy is that the temperature of the power battery is lower than the second set value. The cloud platform enables that the charging device is output in a reduced amount within the current requested by the BMS, namely, performing trickle charging, according to the real-time charging monitoring data uploaded by the charging device during the charging process of the power battery, when the temperature of the power battery is high, or it is predicted that the temperature rise of the power battery will reach or exceed the second set value during charging according to the current auxiliary equilibrium charging strategy.

Excessive voltage difference among individual batteries is the main feature of battery non-equilibrium. Thus, one of the start conditions of the BMS equilibrium strategy at the vehicle side is that the individual battery voltage difference is higher than the third set value. Due to the charging and discharging characteristics of lithium batteries, when the charging current is small, the problem of battery consistency is difficult to appear. The cloud platform, according to the real-time charging monitoring data uploaded by the charging device during the charging process of the power battery, enables the charging and discharging device to output pulse charging or discharging when the charging current is small, so that the battery voltage difference is excessively large to trigger the BMS equilibrium.

The auxiliary equilibrium charging strategy is not a single strategy, but a combination of the above charging strategies. The cloud platform AI adjusts the charging strategy intelligently by analyzing the real-time state of the battery, so as to achieve an efficient equilibrium effect.

In the present embodiment, the degree value of the power battery inconsistency problem is compared with the power battery inconsistency threshold value of the same vehicle type. It triggers the auxiliary equilibrium charging strategy to be issued to the charging device when the degree value of the inconsistency problem of the power battery of the vehicle exceeds the power battery inconsistency threshold value of the same vehicle type. Therefore, according to the difference of equilibrium efficiency under different conditions, the optimal charging curve of equilibrium efficiency can be obtained, and the repair effect of this auxiliary equilibrium charging strategy can be predicted, so as to assist the equilibrium function of BMS at the vehicle side, repair the power battery inconsistency problem, increase the full-power mileage of the electric vehicles, and extend the service life of power battery. Meanwhile, it can also detect whether the BMS equilibrium function at the vehicle side works normally. If the BMS equilibrium function at the vehicle side does not work normally after it is issued to the charging device under the auxiliary equilibrium charging strategy and the start condition of the BMS equilibrium strategy at the vehicle side is satisfied, it indicates that the BMS equilibrium function at the vehicle side fails, and it should remind a user to go to a maintenance station for detection and maintenance. At the same time, when the power battery inconsistency problem is caused by aging, abuse, failure and other factors, and the BMS equilibrium function at the vehicle side cannot meet the power battery inconsistency caused by aging, abuse, failure and other factors, the auxiliary equilibrium charging strategy can predict the occurrence of power battery inconsistency problem in advance and avoid the risk of sudden power loss during driving.

In an embodiment, the method further includes dynamically adjusting by the cloud platform the auxiliary equilibrium charging strategy according to user habits.

In particular, the user habits include user power consumption habits during driving and/or charging habits during parking.

The cloud platform intelligently adjusts an auxiliary equilibrium charging strategy by analyzing the user power consumption habits during driving and/or charging habits during parking, specifically including the followings:

1) The cloud platform analyzes the recent driving habits of the user, such as driving mileage, average power consumption, ambient temperature and weather forecast, and predicts a battery electric quantity SOC range $[soc_0, soc_1]$ that the user may use for the next driving, wherein $soc_0$ is a lowest value of the estimated power usage, and $soc_1$ is a highest value of the estimated power charging.

When the vehicle power battery has no consistency problem, the cloud platform sets $soc_1 < 90\%$. When the consistency problem of the vehicle power battery needs auxiliary equilibrium, the cloud platform sets $soc_1 > 98\%$, so that the battery is fully charged.

2) The cloud platform analyzes the user's recent charging habits during parking, and predicts a user's next parking duration $t_1$ and a battery full-charge duration $t_0$.

According to the degree of consistency problem of vehicle power battery, the cloud platform estimates a duration T needed for auxiliary equilibrium, and then the implementation of auxiliary equilibrium charging strategy can be divided into n times, $n \approx T/(t_1 - t_0)$.

The cloud platform sets the charging terminal current to extend the charging time under the premise of meeting normal vehicle demand of the user.

Since the time of auxiliary equilibrium is related to the inconsistency problem of power battery, the process of auxiliary equilibrium is usually slow. The worse the inconsistency problem of power battery is, the longer the equilibrium time is. Sometimes, the problem needs to be repaired by auxiliary equilibrium for multiple times. Therefore, the above-mentioned adjustment is not finished once. The cloud platform performs adjustment intelligently, multiple times and dynamically according to the user habit and the severity of the power battery consistency problem until the power battery consistency problem is repaired.

In this embodiment, the cloud platform intelligently adjusts the auxiliary equilibrium charging strategy by analyzing the user's power consumption habits during driving and charging habits during parking, so that the auxiliary equilibrium function does not affect the user's daily experience of using the vehicle. The power battery inconsistency problem can be automatically repaired in the background under the user experience without feeling, so as to increase the full-power mileage of the electric vehicles, and extend the service life of power battery.

In the method for vehicle power battery auxiliary equilibrium provided in the present application, according to the difference in equilibrium efficiency under different conditions, a charging curve with an optimal equilibrium efficiency can be obtained to predict the repair effect of the auxiliary equilibrium charging strategy. On the one hand, it reminds a user to rationally plan a trip and arrange auxiliary equilibrium. On the other hand, when the actual effect deviates from the prediction effect, the auxiliary equilibrium charging strategy is intelligently adjusted so as to assist the equilibrium function of the vehicle-side BMS, repair the inconsistency problem of the power battery, decrease the full-power mileage of the electric vehicles, and extend the service life of the power battery. It does not affect the user's daily vehicle use experience, so that the inconsistency problem of the power battery can be automatically repaired in the background under the user experience without feeling, so as to improve the user experience.

Figure 4:
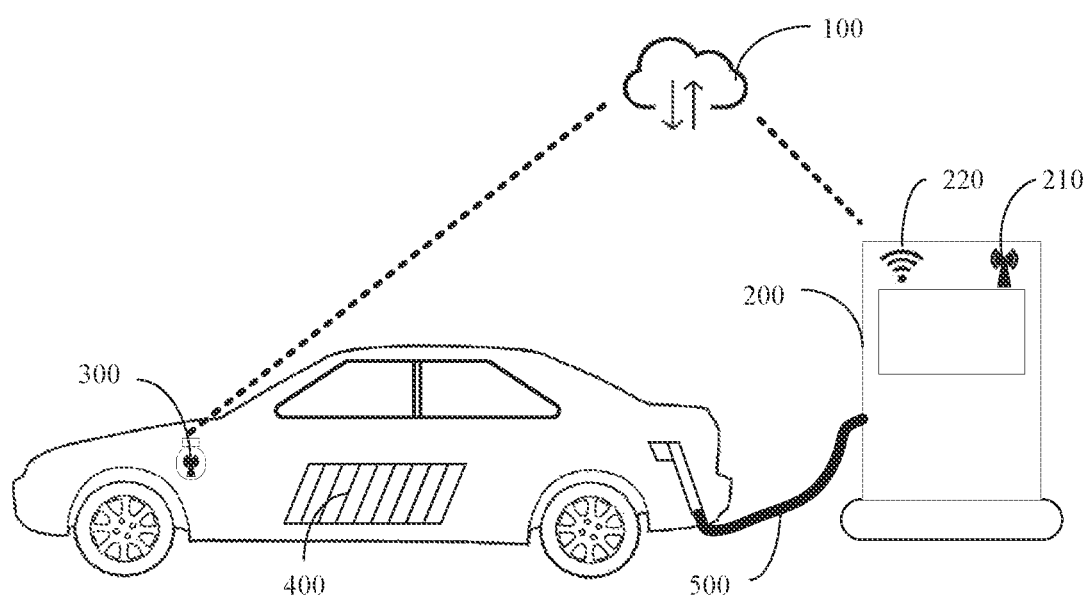
FIG. 4 is a schematic diagram of a system for vehicle power battery auxiliary equilibrium provided by the present application.

Based on the same concept, in an embodiment, as shown in FIG. 4, the present application provides a device 100 for vehicle power battery auxiliary equilibrium to perform the method for vehicle power battery auxiliary equilibrium of any of the embodiments described above.

Preferably, the device 100 for vehicle power battery auxiliary equilibrium is a cloud platform.

It should be noted that the above-mentioned device embodiment and method embodiment belong to the same concept, and the specific implementation process thereof is described in detail in the method embodiment. The technical features in the method embodiment are correspondingly applicable in the device embodiment, and the description thereof will not be repeated here.

Figure 3:
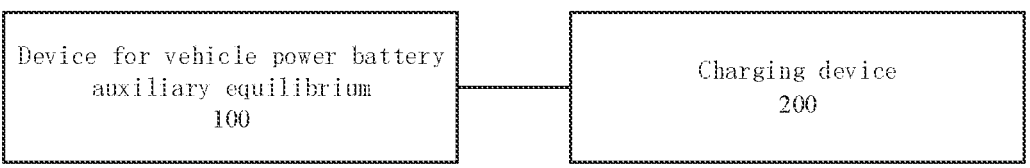
FIG. 3 is a schematic structural diagram of a vehicle power battery auxiliary equilibrium system provided by the present application.

Based on the same concept, in an embodiment, as shown in FIGS. 3 and 4, the present application provides a system for vehicle power battery auxiliary equilibrium, the system including: a charging device 200 and a vehicle power battery auxiliary equilibrium device 100 according to any one of the above-mentioned embodiments, wherein the device 100 for vehicle power battery auxiliary equilibrium is configured for triggering an auxiliary equilibrium charging strategy to be issued to the charging device 200 according to a degree value of a power battery inconsistency problem, and the charging device 200 is configured for charging the power battery according to the issued auxiliary equalizing charging strategy.

Specifically, the device 100 for vehicle power battery auxiliary equilibrium is a cloud platform. Specifically, the cloud platform 100 is used for cleaning, storing, marking and analyzing the collected data of the power battery 400 of the electric vehicle to determine the degree value of the power battery inconsistency problem and establish a corresponding auxiliary equilibrium charging strategy. The auxiliary equilibrium charging strategy is triggered to be issued to the charging device when the degree value of the power battery inconsistency problem exceeds the power battery inconsistency threshold value of the same vehicle type. The equilibrium effect of power battery is evaluated and predicted by the large data machine learning algorithm, and the auxiliary equilibrium charging strategy is adjusted dynamically. In addition, the repair process and effect can be displayed to the user through the operation and maintenance management background on the PC computer side or the APP on the mobile side.

Specifically, the charging device 200 is a device for replenishing electric quantity to the power battery pack of electric vehicles, and can adjust the output power according to the demand of the vehicle-mounted BMS and its own capability. It is a main device for charging process control, including a direct current charging post and an alternating current charging post. The charging device 200 is used to charge the power battery 400 according to the issued auxiliary equilibrium charging strategy. The communication mode of the charging device 200 includes a short-range wireless communication mode (for example, Bluetooth, WiFi) or a mobile communication mode (for example, 4G or 5G mobile communication). The short-range wireless communication mode is realized by using a short-range wireless communication module 210 which can be embedded in the charging device 200, including but not limited to a Bluetooth module and a WiFi module, for short-range communication with the vehicle-mounted communication interface 300. The mobile communication mode is realized by using a mobile communication module 220 which is embedded in a charging device 200 for performing communication and interaction with the cloud platform 100 and can upload data collected by the vehicle-mounted communication interface 300, data of a direct current charging port, data of a charging pile itself, etc. to the cloud platform.

Further, as shown in FIG. 4, the system for vehicle power battery auxiliary equilibrium also includes a vehicle-mounted communication interface 300, a charging gun and a cable 500.

The vehicle-mounted communication interface 300 can monitor information of each electronic control unit (ECU) module on the vehicle. The vehicle-mounted communication interface 300 is mainly used for data collection of a power battery related system, and uploading the collected data to a cloud platform via a preset communication mode. The preset communication mode includes a short-range wireless communication mode (e.g. Bluetooth, WiFi), or a mobile communication mode (e.g. 4G or 5G mobile communication). When a short-range wireless communication mode is used, the vehicle-mounted communication interface 300 itself has a short-range wireless communication function, but does not have a mobile communication function. The charging device has a short-range wireless communication function and a mobile communication function. The vehicle-mounted communication interface 300 establishes a short-range wireless connection with the charging device 200. The charging device 200 establishes a mobile communication connection with the cloud platform 100. The vehicle-mounted communication interface 300 sends the collected data of the power battery to the charging device 200 via the short-range wireless connection, and then sends same to the cloud platform 100 via the mobile communication connection of the charging device 200. When the mobile communication mode is used, the vehicle-mounted communication interface 300 has a mobile communication function, and the vehicle-mounted communication interface 300 directly establishes a mobile communication connection with the cloud platform 100 via the mobile communication function, and sends the collected data of the power battery to the cloud platform 100 via the mobile communication connection.

The charging gun and the cable 500 are interfaces for directly interfacing electric energy and information with the electric vehicles during charging, and are used for connecting the charging device 200 and the vehicle power battery 400. When some electric vehicles comply with "GBT 27930-2015 COMMUNICATION PROTOCOL BETWEEN OFF-BOARD CONDUCTIVE CHARGER OF ELECTRIC VEHICLE AND BATTERY MANAGEMENT SYSTEM", part of status information of the battery during charging can also be obtained by the charging gun and cable.

In the present embodiment, the system for vehicle power battery auxiliary equilibrium includes a charging device and a device for vehicle power battery auxiliary equilibrium, wherein the device for vehicle power battery auxiliary equilibrium determines a degree value of a power battery inconsistency problem according to data of the power battery, triggers an auxiliary equilibrium charging strategy according to the degree value of the power battery inconsistency problem, issues same to the charging device, and enables the charging device to charge the power battery according to the issued auxiliary equilibrium charging strategy, so as to assist the equilibrium function of the vehicle-side BMS, repair the power battery inconsistency problem, increase the full-power mileage of the electric vehicles, extend the service life of the power battery, and reduce the cost of using the vehicle. It does not affect the user's daily vehicle use experience, so that the power battery inconsistency problem can be automatically repaired in the background under the user experience without feeling, so as to improve the user experience.

It should be noted that the above-mentioned system embodiment belongs to the same concept as the method and device embodiment, and the detailed implementation process thereof is described in detail in the method and device embodiment. The technical features in the method and device embodiment are correspondingly applicable in the system embodiment, and the description thereof will not be repeated here.

It should be noted that, as used herein, the terms "including", "comprising", or any other variation thereof, are intended to cover a non-exclusive inclusion, such that a process, a method, an article, or a device that includes a list of elements does not include only those elements but may include other elements not expressly listed or inherent to such process, method, article, or device. An element defined by the language "including a" does not, without more constraints, preclude the existence of additional identical elements in the process, method, article, or device that includes the element.

Finally, it should be noted that the above embodiments are merely illustrative of the technical solutions of the present application, rather than limiting it. Combinations of features in the above embodiments or in different embodiments are also possible within the spirit of the application. The steps can be implemented in any order, and there are many other variations of the different aspects of the application described above, which are not provided in detail for the sake of brevity. Although the application has been described in detail with reference to the foregoing embodiments, those skilled in the art will appreciate that the technical solutions of the each above-mentioned embodiment can still be modified, or some of the technical features thereof can be equivalently substituted. Such modifications and substitutions will not cause the essence of the corresponding technical solutions to depart from the scope of the embodiments of the application.

The invention claimed is:

1. A method for vehicle power battery auxiliary equilibrium, wherein the method comprises:
   determining a degree value of inconsistency problem of a power battery of a vehicle by a cloud platform according to data of the power battery
   according to the degree value of the inconsistency problem of the power battery, triggering by the cloud platform an auxiliary equilibrium charging strategy to be issued to a charging device, so that the charging device charges the power battery according to the issued auxiliary equilibrium charging strategy
   wherein the auxiliary equilibrium charging strategy comprises:
   performing high-rate charging when a voltage capacity of the power battery or individual voltage does not reach a start condition of the vehicle-side battery management system equilibrium strategy;
   performing trickle charging when it is predicted that a temperature of the power battery will increase to reach or exceed a start condition of the vehicle-side battery management system equilibrium strategy; and
   performing pulse charging when voltage difference among individual batteries does not reach the start condition of the vehicle-side battery management system equilibrium strategy;
   wherein the start condition of the vehicle-side battery management system equilibrium strategy comprises one of the followings that the voltage capacity of the power battery or individual voltage is higher than a first set value, the temperature of the power battery is lower than a second set value, and voltage difference among the individual batteries is higher than a third set value.

2. The method according to claim 1, wherein determining a degree value of inconsistency problem of a power battery by a cloud platform according to data of the power battery comprises: analyzing by the cloud platform inconsistency problem of individual batteries according to multiple dimensions of a difference value of individual voltages, a difference value of internal resistances of individual batteries, a difference value of full capacitance of individual batteries and a difference value of current voltage capacity of individual batteries so as to determine the degree value of the inconsistency problem of the power battery.

3. The method according to claim 1, wherein according to the degree value of the inconsistency problem of the power battery, triggering by the cloud platform an auxiliary equilibrium charging strategy to be issued to a charging device comprises: determining a power battery inconsistency threshold value of the same vehicle type;
   comparing the degree value of inconsistency problem of the power battery of the vehicle with the power battery inconsistency threshold value of the same vehicle type, and triggering the auxiliary equilibrium charging strategy to be issued to the charging device when the degree value of the inconsistency problem of the power battery of the vehicle exceeds the power battery inconsistency threshold value of the same vehicle type.

4. The method according to claim 3, wherein the power battery inconsistency threshold value of the same vehicle type is derived from a database of powder battery inconsistency threshold values of different vehicle types pre-established by the cloud platform.

5. The method according to claim 4, wherein the method further comprises dynamically adjusting by the cloud platform the power battery inconsistency threshold value according to a vehicle-side battery management system equilibrium strategy.

6. The method according to claim 1, wherein the method further comprises dynamically adjusting by the cloud platform the auxiliary equilibrium charging strategy according to real-time charging monitoring data uploaded by the charging device during the charging process of the power battery.

7. The method according to claim 1, wherein the method further comprises dynamically adjusting by the cloud platform the auxiliary equilibrium charging strategy according to user habits.

8. The method according to claim 1, wherein the method further comprises: the cloud platform intelligently adjusting the auxiliary equilibrium charging strategy by analyzing user's power consumption habit during driving and/or charging habit during parking.

9. A device for vehicle power battery auxiliary equilibrium, wherein the device is configured to perform the method for the vehicle power battery auxiliary equilibrium according to claim 1.

10. A system for vehicle power battery auxiliary equilibrium, wherein the system comprises a charging device and the device for vehicle power battery auxiliary equilibrium according to claim 9, wherein the device for vehicle power battery auxiliary equilibrium is configured for triggering the auxiliary equilibrium charging strategy to be issued to the charging device according to the degree value of inconsistency problem of the power battery, and the charging device is configured for charging the power battery according to the issued auxiliary equilibrium charging strategy.

* * * * *